(12) United States Patent
Bennett et al.

(10) Patent No.: US 7,318,141 B2
(45) Date of Patent: Jan. 8, 2008

(54) METHODS AND SYSTEMS TO CONTROL VIRTUAL MACHINES

(75) Inventors: Steve M. Bennett, Hillsboro, OR (US); Gilbert Neiger, Portland, OR (US); Erik C. Cota-Robles, Portland, OR (US); Stalinselvaraj Jeyasingh, Portland, OR (US); Alain Kagi, Portland, OR (US); Michael A. Kozuch, Export, PA (US); Richard A. Uhlig, Hillsboro, OR (US); Larry Smith, Beaverton, OR (US); Dion Rodgers, Hillsboro, OR (US); Andrew Glew, San Jose, CA (US); Erich Boleyn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 316 days.

(21) Appl. No.: 10/322,003

(22) Filed: Dec. 17, 2002
(Under 37 CFR 1.47)

(65) Prior Publication Data
US 2004/0117539 A1   Jun. 17, 2004

(51) Int. Cl.
*G06F 12/06* (2006.01)
(52) U.S. Cl. ............................ 711/202; 711/203; 718/1
(58) Field of Classification Search ................ 711/6, 711/202, 203, 170; 718/1, 100
See application file for complete search history.

(56) References Cited

U.S. PATENT DOCUMENTS

| | | | |
|---|---|---|---|
| 4,037,214 A | 7/1977 | Birney et al. ........... | 364/200 |
| 4,247,905 A | 1/1981 | Yoshida et al. ......... | 364/900 |
| 4,278,837 A | 7/1981 | Best ...................... | 178/22.09 |
| 4,347,565 A | 8/1982 | Kaneda et al. .......... | 364/200 |
| 4,366,537 A | 12/1982 | Heller et al. ........... | 364/200 |
| 4,521,852 A | 6/1985 | Guttag .................... | 364/200 |
| 4,571,672 A | 2/1986 | Hatada et al. ........... | 364/200 |
| 4,814,975 A * | 3/1989 | Hirosawa et al. ........ | 718/1 |
| 5,022,077 A | 6/1991 | Bealkowski et al. ..... | 711/163 |
| 5,075,842 A | 12/1991 | Lai ........................ | 711/152 |
| 5,079,737 A | 1/1992 | Hackbarth .............. | 395/425 |
| 5,230,069 A * | 7/1993 | Brelsford et al. ....... | 718/100 |

(Continued)

FOREIGN PATENT DOCUMENTS

| | | |
|---|---|---|
| DE | 4217444 | 12/1992 |
| EP | 0600112 | 6/1994 |
| EP | 0930567 A | 7/1999 |
| EP | 1030237 | 8/2000 |
| EP | 1146715 | 10/2001 |

(Continued)

OTHER PUBLICATIONS

"System/370 extended architecture: Facilities for Virtual Machine" P.H.Gum IBM J. Res. Develop., vol. 27, No. 6 Nov. 1983.*

(Continued)

*Primary Examiner*—Pierre-Michel Bataille
(74) *Attorney, Agent, or Firm*—Thomas R. Lane

(57) ABSTRACT

Methods and systems are provided to control the execution of a virtual machine (VM). A VM Monitor (VMM) accesses VM Control Structures (VMCS) indirectly through access instructions passed to a processor. In one embodiment, the access instructions include VMCS component identifiers used by the processor to determine the appropriate storage location for the VMCS components. The processor identifies the appropriate storage location for the VMCS component within the processor storage or within memory.

25 Claims, 5 Drawing Sheets

U.S. PATENT DOCUMENTS

| | | | | |
|---|---|---|---|---|
| 5,255,379 A | * | 10/1993 | Melo | 711/202 |
| 5,293,424 A | | 3/1994 | Hotley et al. | 380/23 |
| 5,319,760 A | * | 6/1994 | Mason et al. | 711/208 |
| 5,386,552 A | | 1/1995 | Garney | 714/10 |
| 5,421,006 A | | 5/1995 | Jablon et al. | 395/575 |
| 5,437,033 A | | 7/1995 | Inoue et al. | 714/10 |
| 5,455,909 A | | 10/1995 | Blomgren et al. | 714/43 |
| 5,459,869 A | | 10/1995 | Spilo | 709/324 |
| 5,473,692 A | | 12/1995 | Davis | 705/59 |
| 5,479,509 A | | 12/1995 | Ugon | 713/176 |
| 5,511,217 A | | 4/1996 | Nakajima et al. | 709/100 |
| 5,522,075 A | | 5/1996 | Robinson et al. | 709/100 |
| 5,568,552 A | | 10/1996 | Davis | 705/59 |
| 5,615,263 A | | 3/1997 | Takahashi | 713/164 |
| 5,621,912 A | * | 4/1997 | Borruso et al. | 718/1 |
| 5,628,022 A | | 5/1997 | Ueno et al. | 712/37 |
| 5,657,445 A | | 8/1997 | Pearce | 395/186 |
| 5,717,903 A | | 2/1998 | Bonola | 703/24 |
| 5,729,760 A | | 3/1998 | Poisner | 710/3 |
| 5,737,604 A | | 4/1998 | Miller et al. | 713/1 |
| 5,737,760 A | | 4/1998 | Grimmer, Jr. et al. | 711/163 |
| 5,757,919 A | | 5/1998 | Herbert | 713/187 |
| 5,764,969 A | | 6/1998 | Kahle et al. | 712/228 |
| 5,796,845 A | | 8/1998 | Serikawa et al. | 381/18 |
| 5,805,712 A | | 9/1998 | Davis | 713/173 |
| 5,835,594 A | | 11/1998 | Albrecht et al. | |
| 5,844,986 A | | 12/1998 | Davis | 380/4 |
| 5,852,717 A | | 12/1998 | Bhide et al. | 395/200.33 |
| 5,854,913 A | | 12/1998 | Goetz et al. | 712/210 |
| 5,872,994 A | | 2/1999 | Akiyama | 712/43 |
| 5,890,189 A | | 3/1999 | Nozue et al. | 711/100 |
| 5,937,063 A | | 8/1999 | Davis | 713/187 |
| 5,953,502 A | | 9/1999 | Helbig, Sr. | 713/200 |
| 5,978,481 A | | 11/1999 | Ganesan et al. | 380/266 |
| 5,987,557 A | | 11/1999 | Ebrahim | 710/200 |
| 6,014,745 A | | 1/2000 | Ashe | 713/193 |
| 6,055,637 A | | 4/2000 | Hudson et al. | 713/201 |
| 6,058,478 A | | 5/2000 | Davis | 713/191 |
| 6,075,938 A | | 6/2000 | Bugnion et al. | 395/500.48 |
| 6,085,296 A | | 7/2000 | Karkhanis et al. | 711/147 |
| 6,101,584 A | | 8/2000 | Satou et al. | 711/152 |
| 6,125,430 A | | 9/2000 | Noel et al. | 711/152 |
| 6,134,602 A | * | 10/2000 | Engstrom et al. | 719/328 |
| 6,148,379 A | | 11/2000 | Schimmel | 711/152 |
| 6,158,546 A | | 12/2000 | Hanson et al. | 181/255 |
| 6,175,925 B1 | | 1/2001 | Nardone et al. | 713/200 |
| 6,178,509 B1 | | 1/2001 | Nardone et al. | 713/200 |
| 6,182,089 B1 | | 1/2001 | Ganapathy et al. | 707/206 |
| 6,192,455 B1 | | 2/2001 | Bogin et al. | 711/154 |
| 6,205,550 B1 | | 3/2001 | Nardone et al. | 713/200 |
| 6,249,872 B1 | | 6/2001 | Wildgrube et al. | 713/200 |
| 6,272,533 B1 | | 8/2001 | Browne | 709/213 |
| 6,272,637 B1 | | 8/2001 | Little et al. | 713/194 |
| 6,282,651 B1 | | 8/2001 | Ashe | 713/193 |
| 6,282,657 B1 | | 8/2001 | Kaplan et al. | 713/201 |
| 6,292,874 B1 | | 9/2001 | Barnett | 711/153 |
| 6,301,646 B1 | | 10/2001 | Hostetter | 711/206 |
| 6,314,409 B2 | | 11/2001 | Schneck et al. | 705/54 |
| 6,321,314 B1 | | 11/2001 | VanDyke | 711/163 |
| 6,339,815 B1 | | 1/2002 | Feng et al. | 711/163 |
| 6,339,816 B1 | | 1/2002 | Bausch | 711/163 |
| 6,374,317 B1 | | 4/2002 | Ajanovic et al. | 710/105 |
| 6,397,242 B1 | | 5/2002 | Devine et al. | 709/1 |
| 6,499,123 B1 | | 12/2002 | McFarland et al. | 714/724 |
| 6,505,279 B1 | | 1/2003 | Phillips et al. | 711/163 |
| 6,732,220 B2 | * | 5/2004 | Babaian et al. | 711/6 |
| 6,760,815 B1 | * | 7/2004 | Traversat et al. | 711/135 |
| 6,785,886 B1 | * | 8/2004 | Lim et al. | 718/1 |
| 6,802,062 B1 | * | 10/2004 | Oyamada et al. | 718/1 |
| 2001/0021969 A1 | | 9/2001 | Burger et al. | 711/207 |
| 2001/0027527 A1 | | 10/2001 | Khidekel et al. | 713/201 |
| 2001/0037450 A1 | | 11/2001 | Metlitski et al. | 713/152 |
| 2002/0013802 A1 | * | 1/2002 | Mori et al. | 709/1 |

FOREIGN PATENT DOCUMENTS

| | | |
|---|---|---|
| JP | 02000076139 | 3/2000 |
| WO | WO-97/29567 | 8/1997 |
| WO | WO-98/34365 | 8/1998 |
| WO | WO-98/44402 | 10/1998 |
| WO | WO-99/05600 | 2/1999 |
| WO | WO-99/09482 | 2/1999 |
| WO | WO-99/57863 | 11/1999 |
| WO | WO-00/62232 | 10/2000 |
| WO | WO-01/27723 | 4/2001 |
| WO | WO-01/27821 | 4/2001 |
| WO | WO-01/75564 | 10/2001 |
| WO | WO-01/75565 | 10/2001 |
| WO | WO-01/75595 | 10/2001 |
| WO | WO-02/17555 | 2/2002 |
| WO | WO-02/086684 | 10/2002 |

OTHER PUBLICATIONS

"Intel 386 DX Microprocessor 32-Bit CHMOS Microprocessor with Integrated Memory Management", Intel Corporation,(Dec. 31, 1995),32-56; figs. 4-14.

"M68040 User's Manual", Motorola, Inc.,(1993), 1-20.

"Trusted Computing Platform Alliance (TCPA)", *Main Specification Version 1.1a*, Compaq Computer Corporation, Hewlett-Packard Company, IBM Corporation, Intel Corporation, Microsoft Corporation, (Dec. 2001), 1-321.

Berg, C., "How Do I Create a Signed Applet?", *Dr. Dobb's Journal*, 22(8), M&T Publ., Redwood City, CA, (Aug. 1997), 109-111, 122.

Brands, Stefan, "Restrictive Blinding of Secret-Key Certificates", *L. C. Guillou et al., ed., Advances in Cryptology—EUROCRYPT '95*, vol. 921 of *Lecture Notes in Computer Science, Springer-Verlag*, XP-002201306, (1995), 1-35.

Chien, Andrew A., et al., "Safe and Protected Execution for the Morph/AMRM Reconfigurable Processor", *7th Annual IEEE Symposium, FCCM '99 Proceedings*, XP010359180, ISBN: 0-7695-0375-6, Los Alamitos, CA, (Apr. 21, 1999), 209-221.

Cramer, K D., "Information Display Technique for a Terminate Stay Resident Program", *IBM Technical Disclosure Bulletin*, 34(7A), (Dec. 1, 1991), 156-158.

Davida, George I., et al., "Defending Systems Against Viruses through Cryptographic Authentication",*1989 IEEE Symposium on Security and Privacy*, May 1-3, 1989, Oakland, CA, IEEE, 312-318.

Goldberg, R., "Survey of Virtual Machine Research", *IEEE Computer Magazine* 7(6), (1974), 34-45.

Gong, L., et al., "Going Beyond the Sandbox: An Overview of the New Security Architecture in the Java Development Kit 1.2", *Proceedings of the USENIX Symposium on the Internet Technologies and Systems*, Monterey, CA, (Dec. 1997), 103-112.

Gum, P. H., "System/370 Extended Architecture: Facilities for Virtual Machines", *IBM J. Research Development*, 27(6), (Nov. 1983), 530-544.

Heinrich, J., "MIPS R4000 Microprocessor User's Manual", *MIPS Technology, Inc.*, Mountain View, CA; XP00218449, (Apr. 1, 1993), 61-97.

Heinrich, J., "MIPS R4000 Microprocessor User's Manual", *MIPS Technology, Inc.*, Mountain View, CA, (1994), pp. 67-79.

Kargar, Paul A., et al., "A VMM Security Kernel for the VAX Architecture", *Proceedings of the Symposium on Research in Security and Privacy*, Boxborough, MA, XP010020182, ISBN: 0-8186-2060-9, (May 7, 1990), 2-19.

Kashiwagi, Kazuhiko, et al., "Design and Implementation of Dynamically Reconstructing System Software", *3rd Asia-Pacific Software Engineering Conference (APSEC) '96*, Dec. 4-7, 1996, Seoul, South Korea, 278-287.

Lawton, K., "Running Multiple Operating Systems Concurrently on an IA32 PC Using Virtualization Techniques", http://www.plex86.org/research/paper.txt, (Aug. 9, 2001), 1-31.

Robin, John S., et al., "Analysis of the Pentium's Ability to Support a Secure Virtual Machine Monitor", *Proceedings fo the 9th Usenix Security Symposium*, XP0022437347, Denver, CO, (Aug. 14, 2000), 1-17.

Rosenblum, M., "Vmware's Virtual Platform: A Virtual Machine Monitor for Commodity PCs", *Proceedings of the 11th Hotchips Conference,* (Aug. 1999), 185-186.

Sherwood, Timothy , et al., "Patchable Instruction ROM Architecture", *International Conference on Compilers, Architecture, and Synthesis for Embedded Systems* (*CASES*), Nov. 16-17, 2001, 24-33.

* cited by examiner

METHODS AND SYSTEMS TO CONTROL VIRTUAL MACHINES

TECHNICAL FIELD

Embodiments of the present invention relate generally to computer systems and more specifically to the operational control of virtual machines within computer systems.

BACKGROUND INFORMATION

A virtual machine architecture logically partitions a physical machine, such that the underlying hardware of the machine is time-shared and appears as one or more independently operating virtual machines (VMs). A Virtual Machine Monitor (VMM) runs on a computer and facilitates for other software the abstraction of one or more VMs. Each VM may function as a self-contained platform, running its own operating system (OS) and application software. The software running in a VM is collectively referred to herein as guest software.

The guest software expects to operate as if it were running on a dedicated computer rather than in a VM. That is, the guest software expects to control various events and have access to hardware resources on the computer (e.g., physical machine). The hardware resources of the physical machine may include one or more processors, resources resident on the processors (e.g., control registers, caches, and others), memory (and structures residing in memory, e.g., descriptor tables), and other resources (e.g., input-output devices) that reside in the physical machine. The events may include interrupts, exceptions, platform events (e.g., initialization (INIT) or system management interrupts (SMIs), and the like).

The VMM may swap guest software state in and out of the devices, memory and the registers of the physical machine as needed. The VMM may enhance performance of a VM by permitting the direct access to the underlying physical machine. This may be especially appropriate when an operation is being performed in non-privileged mode in the guest software, which limits software access to the physical machine or when operations will not make use of hardware resources in the physical machine which the VMM wishes to retain control.

The VMM regains control whenever a guest operation may affect the correct execution of the VMM or any of the non-executing VMs. Usually, the VMM examines such operations, determining if a problem exists before permitting the operation to proceed to the underlying physical machine or emulating the operation on the behalf of a guest. For example, the VMM may need to regain control when the guest accesses I/O devices, when it attempts to change machine configuration (e.g., by changing control register values), when it attempts to access certain regions of memory, and the like.

Existing systems that support VM operation, control the execution environment of a VM using a fixed format structure, herein referred to as a Virtual Machine Control Structure (VMCS). The VMCS is stored in a region of memory and contains, for example, state of the guest, state of the VMM, and control information indicating under which conditions the VMM wishes to regain control during guest execution. The processor(s) in the physical machine reads information from the VMCS to determine the execution environment of the VM and VMM, and to constrain the behavior of the guest software under control of the VMM.

Conventional architectures locate the VMCS in the memory of the physical machine and allow the VMM to access it using ordinary memory read and write instructions. For this reason, the format of the VMCS must be defined architecturally in the processor instruction set architecture (and documented in specifications and manuals in a manner similar to other system structures and instruction encodings). The VMM is coded directly to these specifications. This structuring limits the flexibility in implementation of the processor(s) supporting the VMM. Since the form of the VMCS is architecturally-defined, the microarchitecture of a particular processor implementation may not make changes in the format, contents, organization, or storage requirements of the VMCS data for reasons of performance, extensibility, compatibility, security, and the like, without also requiring corresponding modifications to the installed base of VMM implementations.

Therefore, there is a need for more flexible implementations of virtual machine architectures, which are not rigidly coupled to the underlying implementation of the physical machines.

DESCRIPTION OF THE EMBODIMENTS

Figure 1:
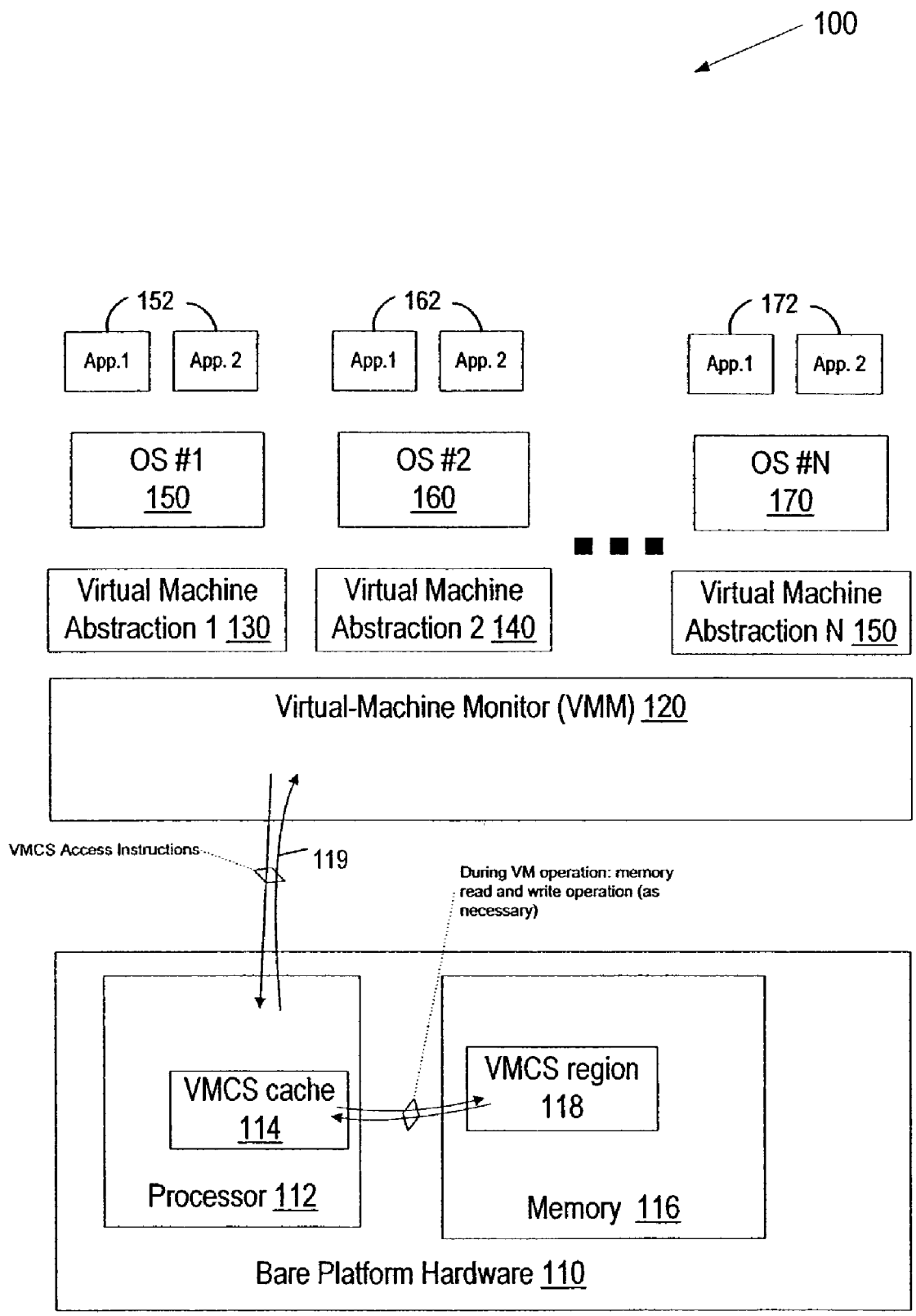
FIG. 1 is a diagram of a VM architecture, in accordance with one embodiment of the invention.

A novel VM control architecture is described. In the following detailed description of the embodiments, reference is made to the accompanying drawings, which form a part hereof, and in which is shown by way of illustration, but not limitation, specific embodiments of the invention may be practiced. These embodiments are described in sufficient detail to enable one of ordinary skill in the art to understand and implement them, and it is to be understood that other embodiments may be utilized and that structural, logical and electrical changes may be made without departing from the spirit and scope of the present disclosure. The following detailed description is, therefore, not to be taken in a limiting sense, and the scope of the embodiments of the inventions disclosed herein is defined only by the appended claims.

A VMM presents to other software ("guest software," "guests," or simply "guest") the abstraction of one or more VMs. The VMM can provide the same or different abstractions to the various guests. Each guest expects the full facilities of the hardware platform presented in the VM to be available for its use. For example, the guest expects to have access to all registers, caches, structures, I/O devices, memory, and the like, according to the architecture of the processor and platform presented in the VM. Further, each guest expects to handle various events such as exceptions, interrupts, and platform events (e.g., initialization (INIT) and system management interrupts (SMIs).

Some of these resources and events are "privileged" because they must be managed by the VMM to ensure proper operation of VMs and to protect the VMM and other VMs. For the privileged resources and events, the VMM facilitates functionality desired by guest software while retaining ultimate control over these resources and events. The act of facilitating the functionality for the guest software may include a wide variety of activities on the part of the VMM. The activities of the VMM, as well as its characteristics, do not limit the scope of various embodiments of the present invention.

When guest software accesses privileged resources or a privileged event occurs, control may be transferred to the VMM. The transfer of control from the guest software to the VMM is referred to as a VM exit. After facilitating the resource access or handling the event appropriately, the VMM may return control to the guest software. The transfer of control from the VMM to the guest software is referred to as a VM entry.

The Virtual Machine Control Structure (VMCS) is an architecturally-defined structure containing, for example, state of the guest software, state of the VMM, control information indicating under which conditions the VMM wishes to prevent the guest from executing, and information regarding the most recent VM exit. In current systems, a representation of the VMCS, which exactly matches the architecturally-defined structure, is located in memory. The processor in the physical machine reads information from the VMCS to determine the execution environment of the VM and to constrain its behavior.

During guest execution, the processor consults the control information in the VMCS to determine which guest actions (e.g. execution of certain instructions, occurrence of certain exceptions, etc.) and events (e.g. external interrupts) will cause VM exits. When a VM exit occurs, components of the processor state used by guest software are saved to the VMCS and components of the processor state required by the VMM are loaded from the VMCS. When a VM exit occurs, control is passed to the VMM 120 using any mechanism known to one of ordinary skill in the art.

When a VM entry occurs, the processor state that was saved at the VM exit (and which may have been modified by the VMM) is restored and control is returned to the guest software. To facilitate the first VM entry to a guest, the VMM writes appropriate guest state to the VMCS. While processing a VM exit, the VMM may change a guest state in the VMCS. In some embodiments, multiple VMCS structures supporting multiple VMs are managed by a single VMM on a single physical machine. The VMCS need not include all the information described above and can include additional information that assists in the control of the VM. In some embodiments, a VMCS can contain a significant amount of additional information.

FIG. 1 illustrates a diagram of a VM architecture 100, in accordance with one embodiment of the invention. The VM architecture 100 includes a base hardware platform 110 (e.g., physical machine). The base hardware platform 110 includes one or more processors 112 each having access to volatile and/or non-volatile memory 116. Additionally, there may be other elements in the base hardware platform that are not shown in FIG. 1 (e.g., input-output devices). The VM architecture 100 also includes a VMM 120 that manages one or more VMs (e.g., 130, 140, and 150), where each VM (e.g., 130, 140, and 150) supports one or more OSs (e.g., 150, 160, and 170) and applications (e.g., 152, 162, and 172). The processors 112 can be any type of processor capable of executing software, such as a microprocessor, digital signal processor, microcontroller, or the like. The processors 112 may include microcode, programmable logic or hardcoded logic for performing the execution of method embodiments of the present invention.

Memory 116 can be a hard disk, a floppy disk, random access memory (RAM), read only memory (ROM), flash memory, any combination of the above devices, or any other type of machine medium readable by processor 112. Memory 116 may store instructions or data for performing the execution of method embodiments of the present invention. The memory 116 includes a VMCS region 118 for use by the processor 112 in maintaining the state of the VMCS, described in more detail below.

The processors 112 can be any type of processor capable of executing software, such as a microprocessor, digital signal processor, microcontroller, or the like. Each processor 112 may include a VMCS cache 114, which is described in more detail below. The processors 112 may include microcode, programmable logic or hard coded logic for performing the execution of method embodiments of the present invention.

If it is present, the VMCS cache 114 may be used to store some or all of the VMCS state either temporarily or throughout its lifetime. The VMCS cache 114 can include registers, cache memory, or any other storage. In FIG. 1, the VMCS cache 114 is shown as part of the processor 112, but it may reside outside of the processor 112 within any component of the bare platform hardware 110. In discussions that follow, the VMCS cache 114 is also referred to as "on-processor storage" or "on-processor resources", but it should be understood that this storage may reside in platform components other than the processor 112. The VMCS cache 114 is not strictly required for implementing the methods of this invention.

Conventionally, a VMM would access a VMCS in memory using ordinary read and write instructions. In the VM architecture 100 of FIG. 1, however, the VMM 120 accesses the VMCS region 118 indirectly through a set of processor-provided VMCS access instructions 119. The VMCS access instructions 119 make use of the VMCS region 118 and any available VMCS cache 114. In an embodiment, VMCS access instructions 119 include an operand that is an identifier for the VMCS component that is being accessed. The identifier is referred to herein as a "component identifier." The VMM 120 does not need to be aware that any particular VMCS component is stored in the VMCS region 118 or in the VMCS cache 114. The VM architecture 100 further provides that if ordinary read and write instructions are used to access the VMCS region 118, unpredictable results may occur. The use of the VMCS access instructions 119 gives the processor 112 freedom in its usage of available on-processor and memory based (e.g., the VMCS region 118) storage and also allows for a variety of performance optimizations.

In some embodiments, the VMCS access instructions 119 are implemented by the processor microarchitecture by reading and writing memory in the VMCS region 118. In other embodiments, the VMCS access instructions 119 may read and/or write on-processor resources. The VMM 120 need not be aware of how the underlying physical machine microarchitecture is supporting the VMCS. In this way, the underlying processor implementation can be altered to accommodate performance, security, reliability, or other considerations without rendering the VMM 120 incompatible with the underlying processor implementation, and customized VMCS implementations can be developed for each processor implementation.

The following example illustrates the drawback of a VM architecture that does not employ VMCS access instructions 119. If a processor implementation can temporarily cache VMCS data in on-processor storage, only writing data to the in-memory VMCS region 118 when a particular event occurs. During the period of time where the VMCS data is cached, an ordinary read to the VMCS region 118 will return a stale value (an incorrect value). An ordinary write to VMCS region 118 will not update data in on-processor storage unless special precautions are taken by the processor implementation to properly map the write to the storage. Without the use of VMCS access instructions 119, the processor implementation must keep the VMCS region consistent with any temporary or cached state stored in on-processor resources; this may preclude certain performance optimizations, extensions of the VM architecture, etc. as is discussed further below. In contrast to the ordinary memory operations, VMCS read instructions return a value stored in on-processor if appropriate and VMCS write instructions properly update the VMCS state, wherever it is located. These instructions are described in detail below.

To facilitate the VMCS access instructions 119, each element of the VMCS is identified by an architecturally-defined constant that identifies the component of the VMCS; these constant values are referred to herein a "component identifiers." In an embodiment, the component identifier is a 16 bit value, but may be larger or smaller in other embodiments.

In the discussions that follow, a number of fields in the VMCS are used in descriptions of various embodiments of the invention. For example, GUEST_EIP is the field containing the instruction pointer for the guest software; VM_CONTROLS is the field containing bits that control the VM execution environment, etc. An understanding of the syntax and semantics of the various fields is not necessary to understand the invention described here. Additionally, the fields are given specific architecturally-defined component identifiers. The specific fields used and the values of the component identifiers in these examples should not limit the applicability of the invention in any fashion.

An illustration of the advantage of the use of VMCS access instructions 119 is as follows. Consider that a processor implementation may change the layout of data stored in the VMCS region 118 from one processor implementation to another. For example, a first processor implementation may store the GUEST_EIP field of the VMCS region starting at the $28^{th}$ byte of the VMCS region. A second processor implementation may store the same VMCS field at the $16^{th}$ byte in the VMCS region. A VMM 120, written for an initial implementation and utilizing the VMCS access instructions 119, will still be functional on the latter implementation of the processor 112 even though the layout of the VMCS region 118 has changed. This compatibility is achieved because the implementation of the VMCS access instructions in the two processor implementations comprehend the layout of the VMCS region 118 used and appropriately access the necessary data.

In some embodiments, to facilitate the VMCS access instructions 119, the VMM 120 can be required to set aside a memory region (e.g., VMCS region 118) to accommodate all or part of the storage required by the processor 112 for the VMCS. In these embodiments of the invention, a processor-provided instruction will permit the VMM 120 to provide a pointer or address of the VMCS region 118 to the processor 112. In an embodiment, the address is a physical address. Other embodiments may use virtual or linear addresses. The address provided to the processor 112 using this instruction is hereafter referred to as a VMCS pointer. This instruction informs the processor 112 of the location of the VMCS region 118. This new instruction makes active a VMCS that may be stored by the processor 112 in whole or in part in the VMCS region 118 referenced by the VMCS pointer.

Another embodiment can provide a mechanism that allows the VMM 120 to discover the amount of memory 116 that must be reserved for a VMCS region 118. For example, in the processor instruction set architecture (ISA) of the Intel Pentium IV (referred to herein as the IA-32 ISA), a Model Specific Register (MSR) can be provided that includes the required VMCS region size. Another embodiment provides an instruction that returns the required VMCS region size. Any other mechanism available may be used to convey this information to the VMM. In this way, the size of the required memory region 118 can change from processor implementation to processor implementation, without forcing a redesign or recompilation of the VMM 120.

For example, suppose that a first processor 112 requires 64 bytes for the VMCS region 118 in memory 116. This requirement is reported to the VMM 120 as described above. A VMM 120 is written to run on this processor implementation, using the mechanism described above to determine how much memory 116 to allocate for the VMCS region 118. A second processor implementation is created that now requires 128 bytes for VMCS storage in memory 116. The VMM 120 written for the first processor implementation will function correctly on the second implementation because it will allocate the correct amount of storage for the VMCS region 118.

While the VMCS pointer is active, the processor 112 can store all or part of the VMCS in the VMCS region 118 or, alternatively, in resources residing on the processor 112 or in any other available location (i.e., in the VMCS cache 114). Additionally, the processor 112 can store non-architectural state information in the VMCS region 118, or in on-processor resources. For example, the processor 112 can store temporary variables, microarchitectural states associated with a VM (e.g., 130, 140, or 150), indicators of the state of the VM (e.g., 130, 140, or 150), and the like. Software does not use ordinary memory reads and writes to access the VMCS region 118 while the VMCS pointer is active. This restriction ensures the correctness of the operation of the VMM 120 and the VM (e.g., 130, 140, or 150) associated with the VMCS.

Another processor-provided instruction writes any VMCS data that was cached in on-processor resources to the VMCS region 118, invalidates the appropriate data in on-processor storage and further deactivates the VMCS pointer. An embodiment may mark the VMCS as inactive by, for example, writing a status indicator that is architecturally or non-architecturally-defined to the VMCS region. Another embodiment may simply flush on-processor storage and deactivate (invalidate) on-processor state for the VMCS. This instruction is executed prior to any attempt by the VMM 120 to move the contents of the VMCS region 118. When a VMM 120 attempts to move the VMCS region 118 it can do so with a single data-block move because the VMCS format is maintained and known only to the processor implementation. Additionally, this block move is possible because the VMM is aware of the size of the VMCS region (having allocated the memory based on the mechanisms described here). Individual elements of the VMCS need not be discernable to the VMM 120.

In some embodiments, a mechanism specific to a particular embodiment can permit the VMM 120 to identify the processor implementation that established a particular VMCS. The VMM 120 can use this processor identification to determine if the VMCS is compatible with another processor implementation. In one embodiment, this identifier is located in the first 4 bytes of the VMCS region 118 and reported to the VMM 120, for example, in an MSR or through any other method. Prior to the first use of a VMCS, the VMM 120 can be required to write this identifier into the appropriate location in the VMCS and hence the format of that part of the VMCS region 118 can be architecturally defined. It is desirable, in some embodiments, that all implementations define identical architecturally-defined portions of the VMCS region 118.

Other embodiments can define new architecturally-defined portions of the VMCS region 118 provided previous embodiments have left the newly defined areas undefined and the newly defined portions do not interfere with the operation of a VMM 120 which does not make explicit use of them. In this way, any VMMs 120 written for these embodiments will be operational on the newer implementations.

In some embodiments the processor-provided instructions 119 include a number of distinct instructions:

- A VMCS load-pointer instruction has a memory address as an operand. This address is the location at which the processor 112 can store the VMCS (e.g., the beginning of the VMCS region 118). The VMCS associated with this address is made active by the instruction. This instruction also allows for activation of a VM (e.g., 130, 140, or 150) associated with and controlled by the VMCS and the use of various other instructions described below. In an embodiment, the address is a physical address. Other embodiments may use virtual or linear addresses.
- A VMCS store-pointer instruction stores a pointer to the active VMCS region 118 into a register (e.g., on the processor 112) or a memory location (e.g., in the memory 116); the location of such storage location may be provided as an operand to the instruction.
- A VMCS read instruction reads a component of the VMCS into a register (e.g., on the processor 112) or a memory location (e.g., in the memory 116). The instruction may include a number of parameters, including a component identifier indicating the VMCS component that is to be read from the VMCS and the location (e.g., register or memory location) where the data read from the VMCS is to be stored.
- A VMCS write instruction loads a component of the VMCS from a register (e.g., on the processor 112) or a memory location (e.g., in the memory 116). Like the VMCS read instruction, a VMCS write instruction may include operands for the VMCS component identifier. Additionally, it may include an operand describing the location (e.g., register or memory location) of the data to be written to the VMCS.
- A VMCS clear instruction ensures the contents of all on-processor storage associated with the VMCS are stored back into the VMCS region 118, invalidates data in on-processor resources and further deactivates the VMCS pointer. This instruction can operate without operands, flushing and deactivating a currently active VMCS pointer, or, in an alternative embodiment, it may take as an operand the VMCS pointer for which flushing and deactivation is required. In an embodiment, a VMCS clear instruction may mark the VMCS as inactive by, writing a status indicator that is architecturally or non-architecturally-defined to the VMCS region.
- Finally, a VMCS enter instruction causes a transfer of control (i.e. a VM entry) to the VM (e.g., 130, 140, or 150) defined by the active VMCS, by loading a processor state according to the semantics of the VM architecture 100 and the contents of the VMCS. Alternatively, the instruction may include an argument with the VMCS pointer (or the location of said pointer) that is to be entered.

The processor-provided instructions 119 described above represent only one embodiment, since a variety of different or alternative instructions 119 can be provided. For example, in some embodiments, the VMCS clear instruction may copy VMCS data from on-processor storage to the VMCS region 118 without deactivating the VMCS pointer. Operands can be explicit or implicit. Other instructions 119 can be provided (or variants on the instructions 119 presented above) that act on all VMCS pointers active in the processor 112, and the like.

As one of ordinary skill in the art appreciates, conventional VM architectures have a static, architecturally-defined form for the VMCS in memory. This limits the ability of the processor implementations to augment or change the size, organization, or contents of the VMCS because changes to the VMCS would require corresponding changes to the VMM implementations. Additionally, since conventional VMMs access conventional VMCSs using ordinary memory read and write operations, the processor implementation has less flexibility in allocating storage of the VMCS data to on-processor resources. For example, the processor may be unable to cache certain portions of the VMCS in on-processor resources during VM exit to the VMM, because the processor may have difficulty detecting if the VMM has made modifications to the corresponding areas of the VMCS in memory. This inability to ascertain coherency between on-processor resources and the in-memory VMCS images complicates error and consistency checking that may be required prior to executing guest software following a VM entry.

However, with various embodiments of the present invention, VMMs 120 do not access the VMCS memory image directly using ordinary memory read and write operations, do not utilize a pre-defined format for the VMCS in memory 116, and determine the required storage size for the VMCS in memory 116 at run-time.

Figure 2:
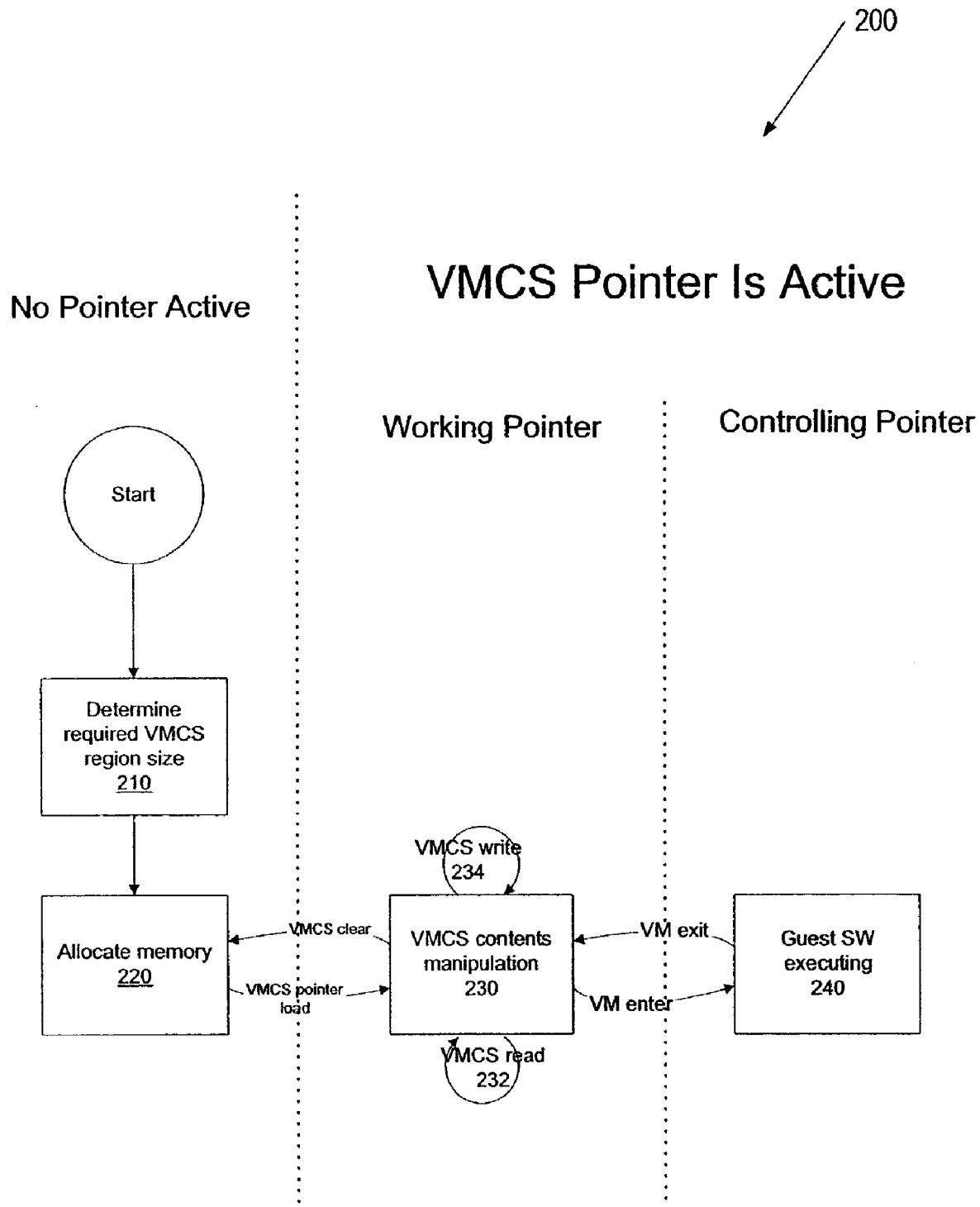
FIG. 2 is a flow diagram of a method to control a VM, in accordance with one embodiment of the invention.

Run-time binding of VMCS storage memory requirements and the use of the processor provided instructions 119, described above, is illustrated in FIG. 2. FIG. 2 illustrates the state of the VMCS pointer through a variety of activities in the VMM. Processing starts in block 210. At this time, there is no active VMCS pointer. In block 210, the VMM determines the size of the memory region required by the processor to support the VMCS. As described above, this may be accomplished by, for example, reading a designated MSR.

In block 220, the VMM allocates the required memory; the VMCS pointer is still inactive. Although optimally this memory region is contiguous within physical memory, it is apparent to one of ordinary skill in the art that no such requirement is necessary with this embodiment. The VMM activates the VMCS by providing the address of the VMCS region to the processor using the VMCS load-pointer instruction, described above (entering block 230). At this point, the VMCS pointer is called a working VMCS pointer. After the VMCS pointer is active, the VMM may read and write components of the VMCS using the appropriate VMCS access instructions (shown in FIG. 1 as 119 and in FIG. 2 as 232 and 234). Following these read or write operations, the VMCS pointer remains active.

When the VMM wishes to allow the guest to execute, it uses the VM entry instruction to load the guest into the machine (entering block 240). After the VM entry, the VMCS pointer is still active, but now functions as a controlling VMCS pointer, used by the processor to determine the guest execution environment and behavior.

When a VM exit occurs, control returns to the VMM (returning to block 230 from block 240). The VMCS pointer remains active, again as a working VMCS pointer; the VMM can read and write VMCS fields (arrows 232 and 234) as appropriate and can enter the guest again using the VM enter instruction (returning to block 240). Alternatively, the VMM may deactivate the VMCS pointer using the VM clear instruction, at which time the VMCS pointer becomes inactive (returning to state 220).

Note that method 200 is not limited to any particular sequence of operations since the VMM may perform a variety of operations (e.g., VM read, VM write, VM enter, etc.) at any particular moment in time. Additionally, at any particular moment in time within a given processor utilizing method 200, a single VMCS pointer or a variety of VMCS pointers can be active or inactive. In some embodiments, multiple VMCSs can be active within any given processor at any particular point in time. In this way a VMM can switch between VMs without executing a VMCS clear instruction, thereby improving VM processing efficiency.

In an embodiment, an additional processor-provided instruction may provide the VMM with the ability to query and obtain the number of concurrent or parallel VMCSs that can be active at any particular point in time. Other embodiments can provide an MSR that the VMM may read to obtain this information. In an alternative embodiment, the number of VMCS pointers that can be active simultaneously (and hence can, for example, be cached in on-processor resources) may not be directly visible to the VMM software, with the processor implementation automatically handling overflow conditions when a VMM activates more VMCS pointers than the processor can store in on-processor resources. In this case, the processor can automatically flush appropriate VMCS data to associated VMCS regions in memory. In some embodiments, explicit VMCS pointer arguments may be required within a number of the processor-provided instructions described above with the discussion of FIG. 1.

Embodiments of the present invention remove requirements on software to manage the details associated with managing on-processor and in-memory storage of VMCS data. Thus, the VMM manages each of the VMs under its control at a higher level of abstraction. This strategy permits the processor-provided instructions, discussed above in FIG. 1 and FIG. 2, to manage the details of VMCS storage such that VM execution is more affordably and optimally altered or extended by adding or modifying the processor-provided instructions without changing existing VMM software.

Figure 3:
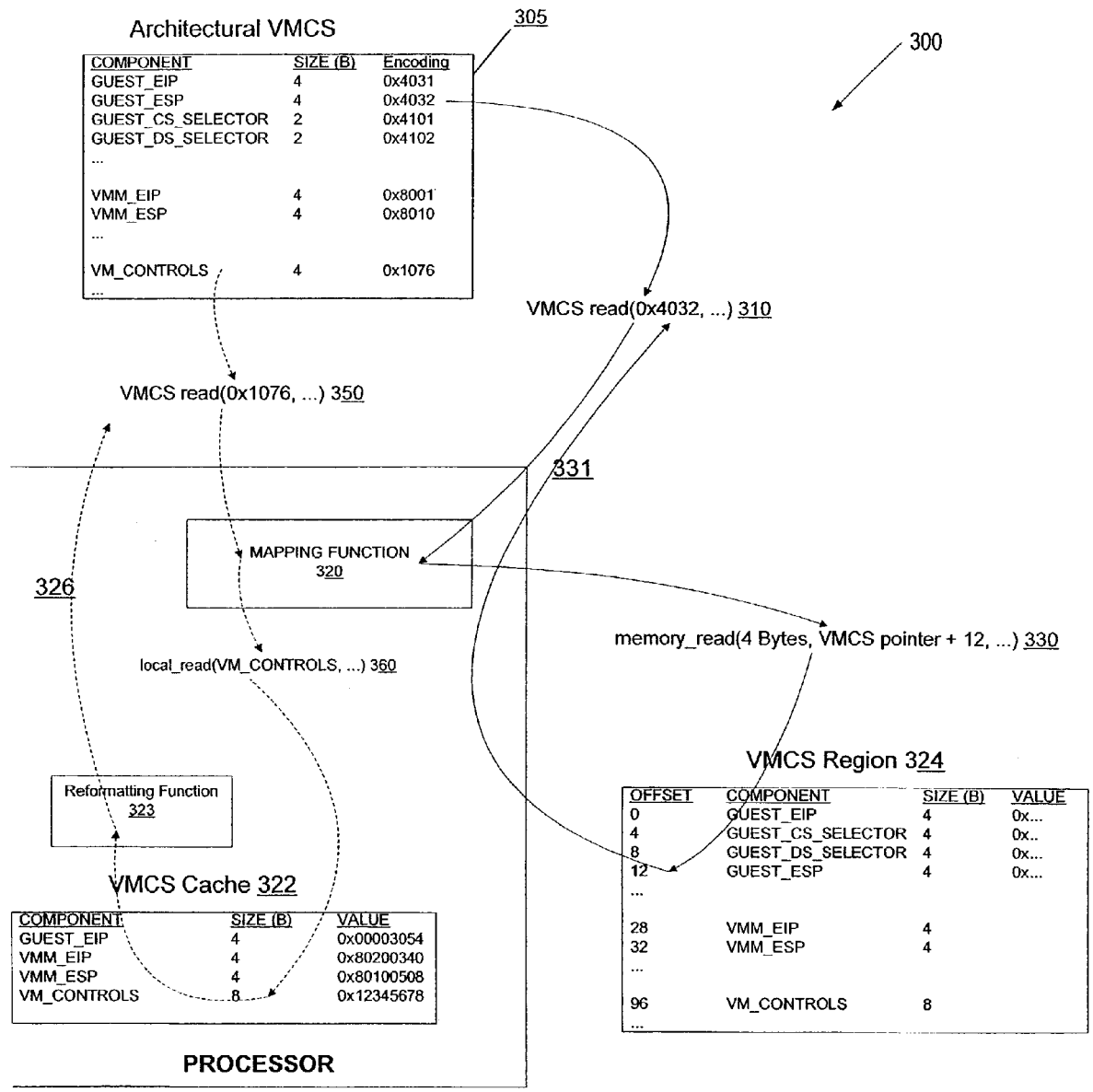
FIG. 3 is a diagram of a VMCS access instruction, in accordance with one embodiment of the invention.

FIG. 3 is a diagram depicting the use of the VMCS read/write instruction in an embodiment of the present invention. The architectural VMCS format 305 is shown, though it is not used explicitly by the VMM; rather, the VMM is programmed with knowledge of the VMCS component identifiers, field sizes and field semantics, but not with an architectural definition of the form of the VMCS storage in memory. When a VMM desires to access a field in the architectural VMCS 305, it performs a VMCS read (or VMCS write, as appropriate; only VMCS read is shown in FIG. 3 for illustrative purposes only). A parameter to the VMCS read instruction 310 is a component identifier, which is an architecturally-defined constant that identifies the component of the VMCS. The processor uses the component identifier to map to on-processor (e.g., the VMCS cache 322) or in-memory resources (e.g., the VMCS region 324) as appropriate to access the VMCS data on behalf of the VMM using a mapping function 320. If the data stored in the VMCS region or VMCS cache is not in the architecturally-defined format, the data is appropriately reformatted to match using a reformatting function 323.

Two example VMCS access instructions are shown in FIG. 3. Though both of these examples are for VMCS read instructions, a similar set of activities occurs for VMCS write instructions as is detailed in discussions below regarding FIG. 5.

Referring to FIG. 3, a first example VMCS read instruction 310 accesses the GUEST_ESP component, which has an architecturally-defined encoding of 0x4032. The processor implementation maintains data for this component in the VMCS region 324, as determined by the mapping function 320. The processor reads the appropriate component data from the VMCS region 324 using a memory read operation 330. The read operation 330 understands the location of the component in the VMCS region 324 (again, as determined by the mapping function 320; in this example, it is located at offset 12 in the VMCS region). The processor then returns the data value to the VMM (shown as arrow 331).

A second example VMCS read instruction 350 accesses the VM_CONTROLS component, which has an architecturally-defined encoding of 0x1076. This processor implementation maintains this component in the VMCS cache 322 (as determined by the mapping function 320). The processor accesses the VMCS cache 322 to retrieve the data. In this case, the data is stored on-processor in a form that does not match the architectural definition of the VM_CONTROLS component (e.g., the data is stored on-processor as a reordered 8 byte object, whereas the architectural definition of the VM_CONTROLS field is a 4 byte object). The processor, prior to returning data to the VMM, reformats the VM_CONTROLS data to match the architectural definition of the field using reformatting function 323. This reformatted value (i.e. the value that matches the architectural definition of the requested component) is returned to the VMM (shown as arrow 326).

Using these VMCS access instructions, a VMM, managing one or more VMs each identified by a separate VMCS, is not required to manage the storage associated with a VMCS as it is cached from memory to on-processor resources. Additionally, the VMM does not need to manage changing processor implementation details, such as the formatting of data in memory or in on-processor resources. Thus, processor developers may alter or modify the VMCS access instructions to improve VM performance and extend VM capabilities without adversely affecting the operation of existing VMMs or VMs. Existing VMMs and VMs may benefit from such alterations, however, as performance, reliability, scalability or other improvements are brought to new implementations of the VM architecture.

Figure 4:
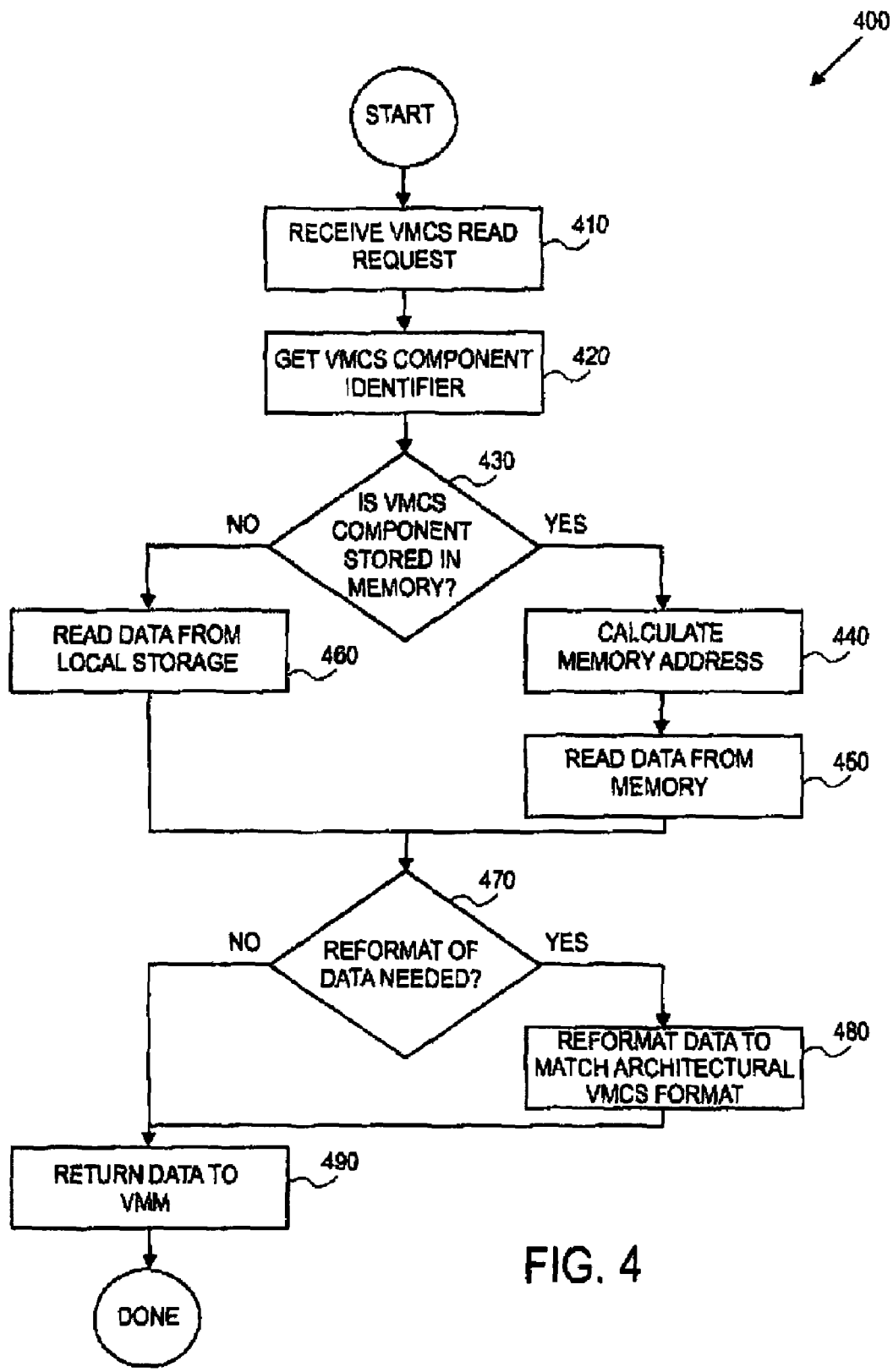
FIG. 4 is a flow diagram of a method to read data from a VMCS, in accordance with one embodiment of the invention.

FIG. 4 is a flowchart of a method 400 for execution of a VMCS read instruction, according to one embodiment of the present invention. In 410, a VMCS read request is received from a VMM. In 420, the VMCS component identifier is acquired from the VMCS read request. The component identifier is an architecturally-defined constant that identifies the desired component of the VMCS.

A processor inspects the component identifier in 430 to determine if the VMCS component associated with the component identifier is in memory. If the VMCS component is stored in memory then the address of the memory location is calculated in 440, and the VMCS data associated with the VMCS component is acquired in 450. However, if the VMCS component is not stored in memory, then the processor acquires the VMCS data associated with the VMCS component from on-processor storage in 460. In this way, the processor uses the component identifier to map the read request to the VMCS component storage, whether it resides in memory or in on-processor storage.

In 470, a check is made by the processor to determine if a reformatting of the VMCS data is required before returning the VMCS data to the VMM. If the VMCS data is stored (either in the VMCS region or in on-processor resources) in the format which differs from the architecturally-defined data format for the VMCS component (i.e. the VMCS component is stored in an implementation-specific data format which differs from the architecturally-defined format), then, in 480, a reformatting function is accessed to translate the implementation-specific VMCS data into an architecturally-defined data format. If the VMCS data is stored (either in the VMCS region or in on-processor resources) in the architecturally-defined data format for the VMCS component, then no reformatting function or translation on the VMCS data need occur. Finally, in 490, the VMCS data (now in the architecturally-defined data format) is returned to the VMM.

Figure 5:
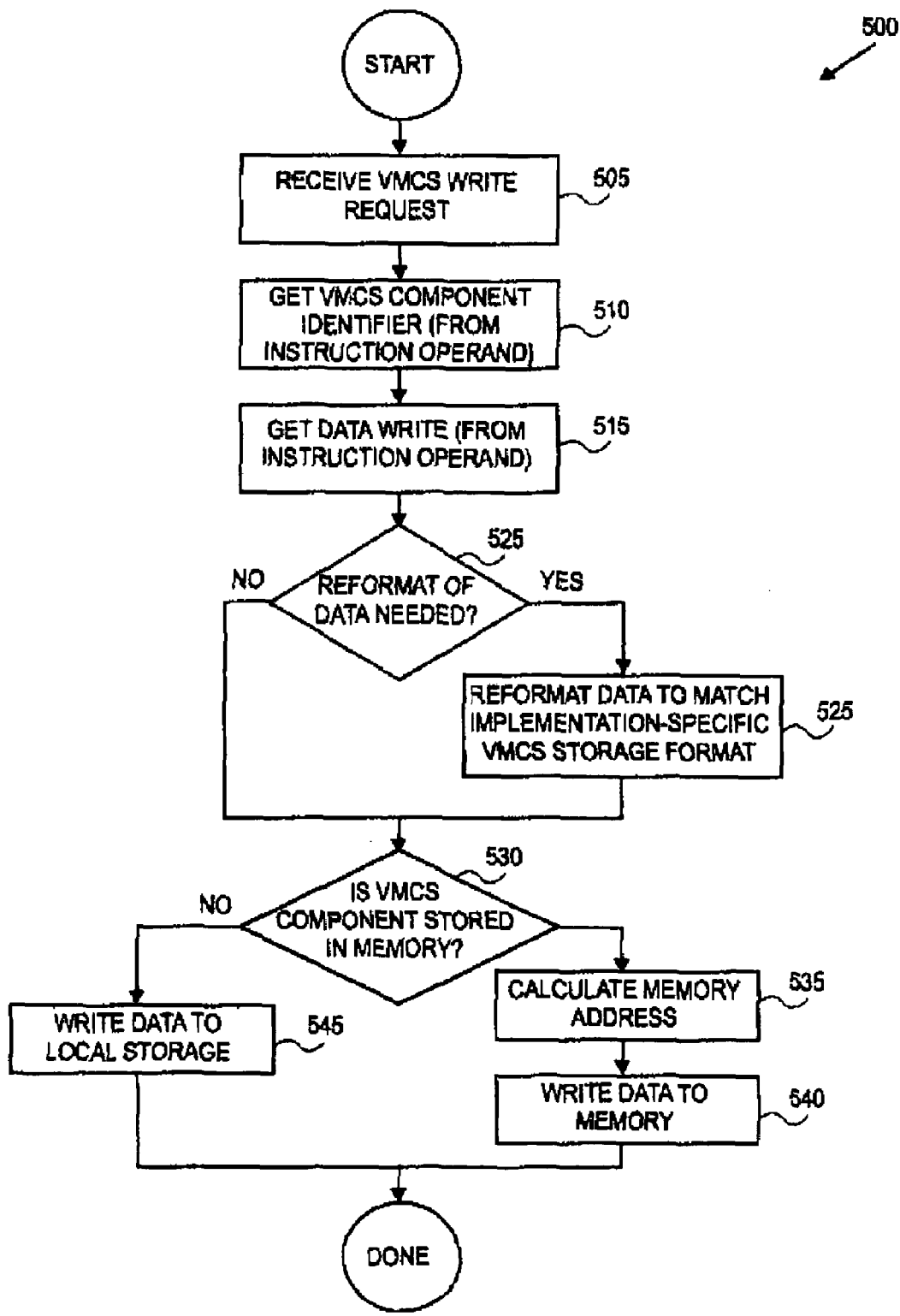
FIG. 5 is a flow diagram of a method to write data to a VMCS, in accordance with one embodiment of the invention.

FIG. 5 is a flowchart of a method 500 for execution of a VMCS write instruction, according to one embodiment of the present invention. In 505, a processor receives a VMCS write request from a VMM. The processor acquires as one of the operands of the write request the component identifier, as depicted in 510. Moreover, in 515, the processor acquires, as another operand, the write data that it is desired to be written to the VMCS. This write data is in the architecturally-defined data format for the VMCS component being written.

In 520, a check is made to determine if the VMCS component is stored in an architecturally-defined data format by the processor (in the VMCS region or in on-processor resources). Accordingly, if the VMCS component is not stored in the architecturally-defined data format, then, in 525, the appropriate reformatting of the data is performed so that the data is in the appropriate implementation-specific data format associated with the VMCS component being accessed. The format in which data is stored may be identical to the architecturally-defined format, or it may differ in size or organization.

Next, in 530, another check performed to determine the location at which the VMCS component is stored by the processor. Using the component identifier, the processor determines where the storage for the VMCS component is located. If the storage location is in memory, then, in 535, the memory address is calculated, and, in 540, the write data is written to the memory location. However, if the storage location is not in memory, then, in 545, the appropriate location in on-processor storage is determined, and the write data is written to the on-processor storage. The data written to the storage is in the implementation-specific data format, which may be the same or different than the architecturally-defined format, depending on the VMCS component in question, the processor implementation, and, in some embodiments, on whether the component in question is currently store in on-processor resources or in the VMCS region.

The mechanism used in processes 400 and 500 to determine the storage location for a particular VMCS component and to determine if the VMCS component is stored in the architecturally-defined data format by the processor are implementation specific. In an embodiment, the processor utilizes a lookup table that is indexed by the component identifier. Additionally, note that if multiple VMCS pointers may be active simultaneously, these determinations may depend on which VMCS is being accessed.

One of ordinary skill in the art will understand, upon reading and comprehending this disclosure, the manner in which the invention may be implemented in a computer-based system to perform the methods disclosed herein. The invention may be implemented using software (such as run on a general purpose computer system or a dedicated machine), hardware (e.g., circuitry, dedicated logic, programmable logic, microcode, etc.) or a combination of hardware and software.

It is to be understood that the above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

It is emphasized that the Abstract is provided to comply with 37 C.F.R. §1.72(b) requiring an Abstract that will allow the reader to ascertain quickly the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A virtual machine (VM) control system, comprising:
   a Virtual Machine Monitor (VMM) that controls at least one virtual machine (VM) by accessing at least one Virtual Machine Control Structure (VMCS), where each of the at least one VMs is controlled by one of the at least one VMCSs;
   a processor having access to a storage where the storage include storage locations associated with the VMCS; and
   wherein the VMM uses VMCS access instructions to access each of the VMCSs.

2. The system of claim 1, wherein the storage is comprised of at least one of a memory and a cache.

3. The system of claim 1, wherein each access instruction includes a VMCS component identifier used by the processor to determine a VMCS component within one of the VMCSs being accessed and to determine a storage location associated with said VMCS component.

4. An article comprising a machine-accessible medium having associated instructions. wherein the instructions, when accessed, result in a machine comprising at least one component performing:
   identifying a storage location associated with an access instruction received from a Virtual Machine Monitor (VMM);
   determining a type of access instruction received from the VMM;
   determining a data format associated with data that satisfies the access instruction; and reformatting the data to an architecturally-defined data format, if the data is not in the architecturally-defined data format, before processing the access instruction.

5. The article of claim 4, wherein in identifying, the access instruction includes a component identifier.

6. The article of claim 4, wherein in identifying, the component identifier is used to map the VMM access instruction to the storage location that is at least one of located on a processor or in a memory.

7. The article of claim 4, wherein in determining the type of access instruction, the type is associated with at least one of a read instruction and a write instruction.

8. A method to activate a Virtual Machine Control Structure (VMCS):
conveying, from a processor to a Virtual Machine Monitor (VMM), a required storage size for a VMCS;
providing the processor with a pointer to a memory region that is at least as large as the required storage size for the VMCS; and
storing, by the processor, a portion of the VMCS in the memory region.

9. The method of claim 1 wherein in conveying the required storage size for the VMCS, the required storage size is conveyed by performing at least one of a read instruction for a processor register containing the required storage size for the VMCS and executing an instruction which provides the required storage size for the VMCS.

10. The method of claim 1, wherein in providing the processor with the pointer, the pointer is provided by executing a VMCS pointer load instruction.

11. The method of claim 10, wherein in executing the VMCS pointer load instruction, the VMCS pointer load instruction includes, as an operand, a pointer address to the memory region at least as large as the required storage size for the VMCS, the operand being at least one of an explicit operand to the VMCS pointer load instruction and an implicit operand to the VMCS pointer load instruction.

12. The method of claim 1 further comprising, allocating the memory region prior to providing the processor with the pointer to the memory region.

13. A method to access a Virtual Machine Control Structure (VMCS), comprising:
executing, by a Virtual Machine Monitor (VMM), a VMCS access instruction; and
storing, by a processor, a VMCS component by using a VMCS component identifier associated with the VMCS access instruction.

14. The method of claim 13 wherein in storing the VMCS component, the VMCS component identifier is at least one of an explicit operand to the VMCS access instruction and an implicit operand to the VMCS access instruction.

15. The method of claim 13 wherein in executing the VMCS access instruction, the VMCS access instruction is at least one of a read instruction from the VMCS component and a write instruction to the VMCS component.

16. The method of claim 15 wherein executing the VMCS access instruction, the VMCS access instruction is a write instruction to the VMCS component and the VMCS access instruction includes a write data value as an operand.

17. The method of claim 16 wherein in executing the VMCS access instruction, the write data value is in an architecturally-defined data format.

18. The method of claim 16 further comprising writing the write data value to the VMCS component.

19. The method of claim 13 further comprising:
determining that the VMCS component identifier is associated with the VMCS component which resides in memory; calculating a memory location for the VMCS component which resides in memory; and
accessing the VMCS component which resides in memory.

20. The method of claim 13 further comprising:
determining that the VMCS component identifier is associated with the VMCS component which resides in on-processor storage; and
accessing the VMCS component which resides in on-processor storage.

21. The method of claim 13, wherein in executing the VMCS access instruction, the VMCS access instruction is a read instruction from the VMCS component and wherein in accessing the VMCS component further comprises reading data associated with the VMCS component and returning the data associated with the VMCS component to the VMM.

22. The method of claim 21 wherein in returning the data associated with the VMCS component to the VMM, returning the data includes reformatting the data associated with the VMCS component to match an architecturally-defined data format for the VMCS component, producing a return data value and returning the return data value to the VMM.

23. The method of claim 21, wherein in returning the data associated with the VMCS component to the VMM, the data is in a format that is at least one of a same format as an architecturally-defined data format for the VMCS component and different format than the architecturally-defined data format for the VMCS component.

24. The method of claim 23, further comprising:
reformatting the write data to match an implementation-specific data format for the VMCS component resulting in a reformatted write data value; and
writing the reformatted write data value to the VMCS component.

25. The method of claim 24 wherein in reformatting the write data, the implementation-specific data format for the VMCS component is at least one of the same format as the architecturally-defined format for the VMCS component and a different format than the architecturally-defined format for the VMCS component.

* * * * *